United States Patent [19]
Andrews

[11] Patent Number: 5,248,239
[45] Date of Patent: Sep. 28, 1993

[54] THRUST CONTROL SYSTEM FOR FLUID HANDLING ROTARY APPARATUS

[75] Inventor: Frank X. Andrews, Mission Viejo, Calif.

[73] Assignee: ACD, Inc., Santa Ana, Calif.

[21] Appl. No.: 853,956

[22] Filed: Mar. 19, 1992

[51] Int. Cl.$^5$ ................................................ F01D 3/02
[52] U.S. Cl. ................................. 415/104; 415/105; 415/107; 417/365; 417/407
[58] Field of Search ................. 415/1, 14, 26, 48, 104, 415/107, 105, 131, 900; 417/365, 407; 91/454

[56] References Cited

U.S. PATENT DOCUMENTS

| | | |
|---|---|---|
| 3,782,250 | 1/1974 | Kiszewski ........................ 91/454 |
| 3,895,689 | 7/1975 | Swearingen . |
| 4,170,435 | 10/1979 | Swearingen ...................... 415/104 |
| 4,416,187 | 11/1983 | Nyström Per .................... 91/454 |
| 4,609,332 | 9/1986 | Miki et al. ...................... 417/365 |
| 4,884,942 | 12/1989 | Pennick .......................... 415/107 |
| 5,104,284 | 4/1992 | Hustak et al. ................... 415/107 |
| 5,127,792 | 7/1992 | Katsuta et al. .................. 415/107 |

Primary Examiner—Edward K. Look
Assistant Examiner—Mark Sgantzos
Attorney, Agent, or Firm—Harold L. Jackson

[57] ABSTRACT

A thrust control system for fluid handling rotary machines, such as turbo expanders equipped with a magnetic thrust bearing, includes a magnetic thrust control circuit for providing a thrust signal which is a measure of the magnitude and direction of the thrust force on the thrust bearing. The rotor and stator of the machine have generally axially opposed thrust areas separated by a thrust cavity. Valves are connected between the thrust cavity and high and low pressure fluid sources. A controller, responsive to the thrust signal, controls the valves to selectively conduct fluid between the cavity and the high and low pressure sources to increase or decrease the fluid pressure in the cavity to minimize variations of the thrust force from a preset value which could be zero, for example.

14 Claims, 2 Drawing Sheets

5,248,239

THRUST CONTROL SYSTEM FOR FLUID HANDLING ROTARY APPARATUS

FIELD OF THE INVENTION

The present invention relates to rotary machines and particularly to fluid handling apparatus such as turbo expander systems.

DESCRIPTION OF THE PRIOR ART

Turbo expanders typically include a stationary stator or housing and a rotor mounted therein on a shaft. The stator includes an inlet into which a high pressure gas, such as a cryogenic fluid e.g, $N_2$, $O_2$, etc, is introduced. The high pressure gas is directed, via circumferentially arranged inlet guide vanes or nozzles, radially and tangentially toward a rotor, generally in the form of a turbine wheel with radially outwardly inclined blades, which directs the lower pressure exhaust gas axially through a housing outlet.

The gas, as it expands through the rotor, causes the rotor to rotate. The energy of the expanding gas is generally absorbed by a brake or preferably a pumping element such as a compressor coupled to the shaft. Radial bearings and one or more thrust bearings serve to support the rotor within the stator and accommodate the radial and axial (thrust) loads imparted to the rotor. It is customary to provide a seal (e.g. a wheel labyrinth seal) between the outer circumference of the rotor wheel and the stator and another seal between the closed end of the rotor wheel (e.g. the shaft) and the stator. An internal thrust chamber or cavity is formed by the seals and the generally axially opposed annular areas of the rotor and stator located between the seals. Centrifugal compressors, centrifugal pumps and radial turbines have rotors, seals and thrust chambers generally similar to turbo expanders.

A turbo expander/compressor unit in a typical hydrocarbon processing plant must operate over a wide range of conditions. The process pressures are also usually very high i.e. high pressures of the order of 100-1000 psi and low pressures of the order of 50 to 100 psi. While well designed oil lubricated thrust bearings (e.g. hydrodynamic bearings) can normally withstand such loads, the prior art has proposed several techniques for reducing the thrust loads on such bearings and particularly the thrust imposed by high pressure gas leaking past the outer seal into the thrust cavity. The most conventional approach has been to merely vent the cavity to the low pressure side of the pump or turbine.

A system for controlling the venting operation is disclosed in U.S. Pat. No. 3,895,689. The '689 patent teaches the use of a specially designed oil bearing in which the thrust load can be approximately calculated by measuring the difference in the pressure of the lubricant across the bearing. According to the '689 patent, the differential pressure may be used to control the flow of fluid from the thrust cavity to the low pressure outlet of the expander. This system not only requires a special oil bearing arrangement but the thrust loads which may be imposed on the back of the rotor are limited by the pressures which would normally build up behind the rotor without venting and the outlet pressure Another prior art patent issued to the same inventor, U.S. Pat. No. 4,170,435, teaches the use of several thrust cavities behind the rotor of a turbo expander. Manually controlled valves interconnect the cavities or one or more of the cavities to the expander inlet or outlet to adjust the thrust on the rotor. While the patent suggests that the system may be operated automatically, no apparatus for accomplishing such a task is disclosed.

All of the above systems are directed to rotary fluid handling machines which have oil lubricated thrust bearings. However, such bearings are subject to vibration wear and even failure where the lubrication system becomes defective. To eliminate the wear and vibration inherent in oil lubricated bearings, fluid handling rotary machines have more recently been equipped with active magnetic bearings, i.e. radial as well as thrust bearings. The radial bearings typically comprise a rotor equipped with ferromagnetic laminations held in position by a magnetic field produced by electromagnets mounted on the stator. The thrust or axial bearing typically comprises a disk armature (i.e. thrust disk) which is mounted on the rotor and extends perpendicular to the rotational axis. Electromagnets are mounted on the stator and positioned on each side of the thrust disk. Radial and axial sensors detect any deviation of the rotor from its nominal radial and axial position. Separate radial and axial servo systems respond to the outputs of the sensors and supply current to the electromagnets to bring the rotor back to its nominal position.

While active magnetic bearings provide many advantages over oil lubricated bearings, the ability of a magnetic thrust bearing to carry axial thrust loads is proportional to the size of the thrust disk (i.e. its diameter). With a slow machine the size or diameter of the thrust disk can be increased until adequate capacity is obtained. However, rotary machines and in particular expanders and expander/compressor units operate at very high speeds (e.g. 10,000-100,000 rpm). The centrifugal stress levels created in the thrust disk by the rotational speed limit the size of the disk. In addition, the thrust disk must be a separate part from the shaft and have good magnetic properties. Materials such as steel have good magnetic properties but poor strength characteristics at the low temperatures (e.g. $-300°$ F.) encountered by rotary machines handling cryogenic fluids. As a result of the above limitations on size and materials, the load capacity of a magnetic thrust bearing used in expanders is typically only 10-15% of that of conventional oil lubricated bearings (i.e. 40 psi vs 300 psi).

While a machine may be designed to balance the thrust load at one operating condition, the loads at other operating conditions or transient loads may exceed the capacity of the thrust bearings. If most of the capacity (e.g. 80-90%) of the magnetic thrust bearing is used to support the anticipated steady state load, a relatively small transient or unexpected load (e.g. 10-20% of the bearings capacity) can cause the bearing to lose control of the shaft. Auxiliary mechanical thrust bearings are generally provided for such contingencies. However, when the magnetic thrust bearing loses control, the rotor or shaft will crash onto the auxiliary bearings requiring such bearings to accelerate to full speed while supporting the full thrust load. Typically, the magnetic thrust bearing cannot regain control of the rotor or shaft until the load has been reduced to about 40-50% of the bearing's capacity. Auxiliary bearings have demonstrated a very limited capacity to withstand repeated instances of loss of control by the magnetic bearing.

There is a need for a system which will continuously maintain the thrust load supported by thrust bearings and particularly magnetic thrust bearings in fluid handling rotary machines at about zero or at some other preset value (i.e. where the rotor is to be biased in one direction) to maximize the available capacity of the thrust bearing for transient loads etc.

SUMMARY OF THE INVENTION

In accordance with the present invention a system is provided for controlling the thrust on a thrust bearing between the rotor and stator of a fluid handling rotary machine which includes an inlet for receiving fluid at one pressure and an outlet for discharging fluid at another pressure. The rotor and stator have generally axially opposed thrust areas which are separated by a thrust cavity bounded at an inner and an outer circumference by radially spaced seals. The stator defines a fluid passageway in communication with the thrust cavity.

Thrust signal generating means which may, for example, be responsive to the currents supplied to the two opposing electromagnets of the thrust bearing, provides a thrust signal which is a measure of the magnitude and direction of the thrust force on the thrust bearing. The system includes first and second sources of fluid under pressure with the first source being at a different pressure level than the second source. Valve means are connected between the fluid passageway and the first and second sources of pressurized fluid. A controller responsive to the thrust signal, is provided to control the valve means for selectively conducting fluid from the cavity to the first and second sources, via the fluid passageway, or vice versa, to increase or decrease the fluid pressure in the cavity to minimize variations of the thrust force from a preset value which may be zero or a value designed to bias the rotor in one direction.

The features of the present invention can best be understood be reference to the following description taken in conjunction with the drawings in which like reference numerals designate like parts.

DESCRIPTION OF THE PREFERRED EMBODIMENT

Figure 1:
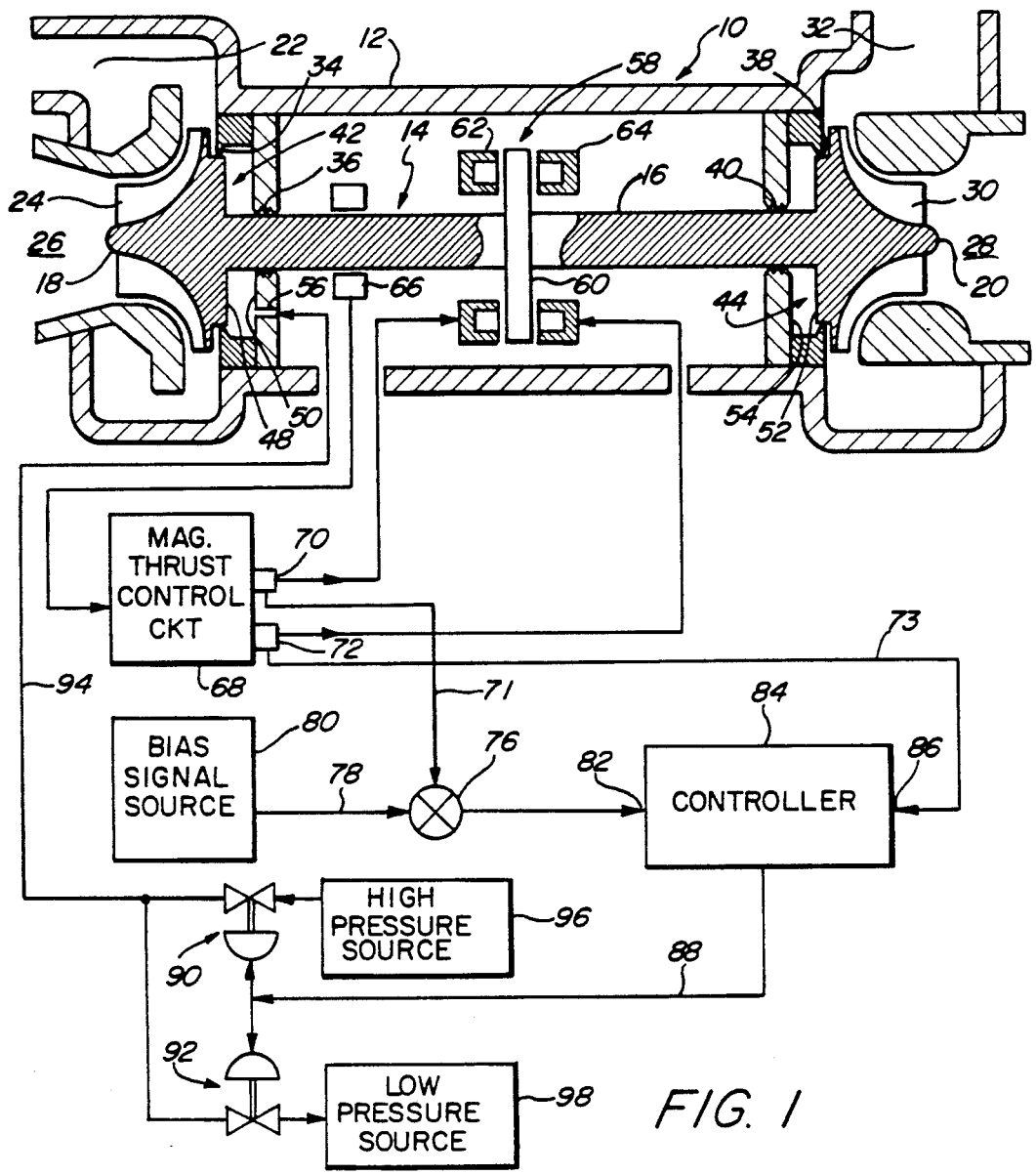
FIG. 1 is a schematic illustration of a thrust control system for fluid handling rotary machines in accordance with my invention.

Referring now to the drawings and particularly to FIG. 1, a fluid handling rotary machine in the form of a turbo expander/compressor unit 10 includes a stationary housing or stator 12 and a rotating assembly or rotor 14 mounted for rotation within the stator on suitable radial bearings (not shown).

The rotor 14 comprises a shaft 16, a turbine or expander wheel 18 at one end of the shaft and a compressor wheel 20 at the other end of the shaft. An expander inlet 22 directs a cryogenic fluid under pressure, e.g. 100-1000 psi, through conventional annular expander inlet guide vanes or nozzles (not shown) to conventional radially extending vanes 24 on the expander wheel 18. The fluid is expanded in the expander wheel and discharged through a diverging expander outlet port 26 in the stator housing 12. The compressor wheel 20 utilizes the energy imparted to the shaft 16 by the expanding fluid to compress another fluid from a compressor section inlet port 28 through radial vanes 30 to a compressor outlet port 32. Annular rotary seals such as floating labyrinth seals 34, 36, 38 and 40 are provided between the stator and rotor to inhibit the leakage of fluid or gas from the high pressure sides (expander inlet 22 and compressor outlet 32) of the machine 10 into annular thrust cavities 42 and 44 between the rotor and stator (via seals 34 and 38) and past the closed ends of the wheels to the space between the central portion of the shaft and the stator (via seals 36 and 40). The thrust cavity 42 between the back of the expander wheel and the stator is formed by generally axially aligned annular thrust areas 48 (on the back of the expander wheel) and 50 (on the stator) and the seals 34 and 36. By the same token the thrust cavity 44 is formed by generally axially aligned annular thrust area 52 (on the back of the compressor wheel) and 54 (on the stator) and the seals 38 and 40. A fluid passageway 56, extending through the stator housing 12, provides a fluid communication to the thrust cavity 42 so that the fluid pressure within the cavity may be controlled to counterbalance the external thrust on the rotor as will be explained.

A conventional active magnetic thrust bearing 58 for accepting the thrust load on the rotor includes a thrust disk armature 60 mounted on the rotor (perpendicular to the rotation axis) and a pair of annular electromagnets 62 and 64 carried on the stator and positioned on either side of the thrust disk 60. A conventional axial position sensor 66 is carried by the stator and in cooperation with ferromagnetic laminations in the rotor (not shown) constantly detects any deviation of the shaft from a nominal or centered position and provides a signal to a conventional magnetic thrust control circuit 68. The circuit 68 in turn supplies current (e.g. at a voltage of 120 vdc) to the expander wheel and compressor wheel electromagnets (62 and 64, respectively) to bring the rotor back to its nominal position.

Current detectors 70 and 72, contained as part of the magnetic thrust control circuit 68, monitor the current to the electromagnets and provide output signals on leads 71 and 73 representative of the current to the respective electromagnets. The difference of these signals is proportional to the direction and magnitude of the thrust load on the bearing 58. The signal on lead 71 is supplied to a summing circuit 76 where it is summed with a signal (representative of a preset thrust force) on lead 78 from a bias signal source 80. The output (i.e. set point signal) of the summing circuit 76 is supplied to one input 82 of a controller 84. The other input 86 of the controller (i.e. process signal) receives the output signal on lead 73. The output signal on lead 88 from the controller is supplied to a pair of conventional electrically actuated pneumatic valves 90 (pressurization valve) and 92 (vent valve) which conduct fluid to the thrust cavity (via passageway 56 and conduit 94) from a high pressure fluid source 96 or conduct fluid from the thrust cavity to a low pressure source 98, as illustrated.

Figure 2:
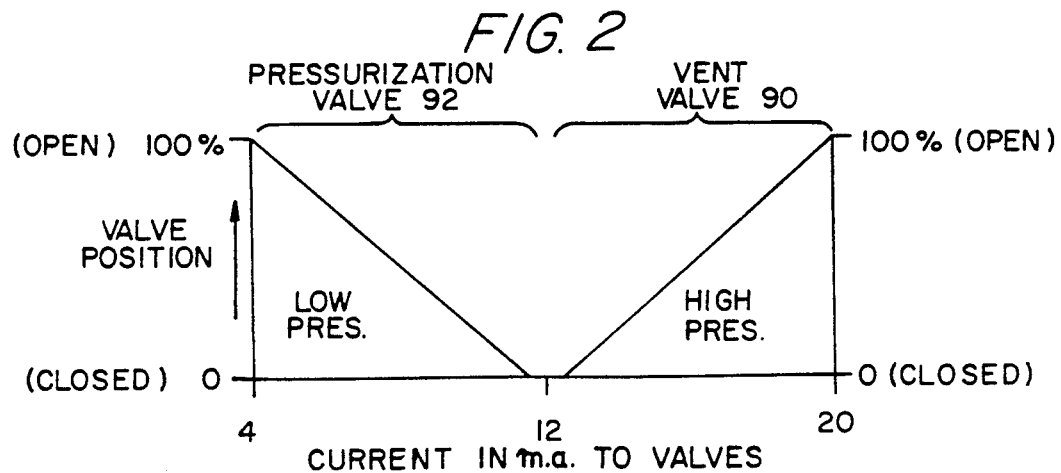
FIG. 2 is a graph of the open or closed states of the pressure control valves of FIG. 1 versus the output from the controller.

Referring now to FIG. 2, the controller 84 is arranged to provide a constant output signal of one value, such as 10 ma, when the set point and process signals (on inputs 82 and 84) are equal. Where the bias signal on lead 78 is zero the above condition represents a zero thrust load on the thrust bearing 58. The controller reduces its output signal on lead 88 (e.g. from 10 ma) when the load on the thrust bearing represents a net thrust force (with zero bias) tending to move the rotor toward the expander side (to the left in FIG. 1) and increases its output signal when the thrust load tends to move the rotor toward the compressor side (to the right). The controller 84 is arranged to provide an output signal of 4 ma when a maximum reduction of pressure behind the expander wheel (in the thrust cavity 42) is desired and an output signal of 20 ma when maximum pressure behind the expander wheel is desired.

The valves 90 and 92 are configured so that both valves are fully closed when the controller output on lead 88 is 12 ma. The vent valve 92 starts to open at a controller output signal valve of slightly less than 12 ma, e.g 11.9 ma, and becomes fully open at a controller output signal value of 4 ma. The pressurization valve 90 starts to open at a controller output signal value of slightly more than 12 ma, e.g. 12.1 ma, and becomes fully open at a controller output signal value of 20 ma. At intermediate values one of the valves 90 or 92 will be partly open as is illustrated in FIG. 2. It should be noted that the above current levels are only exemplary.

It should also be noted that there is continuous fluid flow into or out of the thrust cavity 42 past the wheel and shaft seals 34 and 36, respectively.

Figure 3:
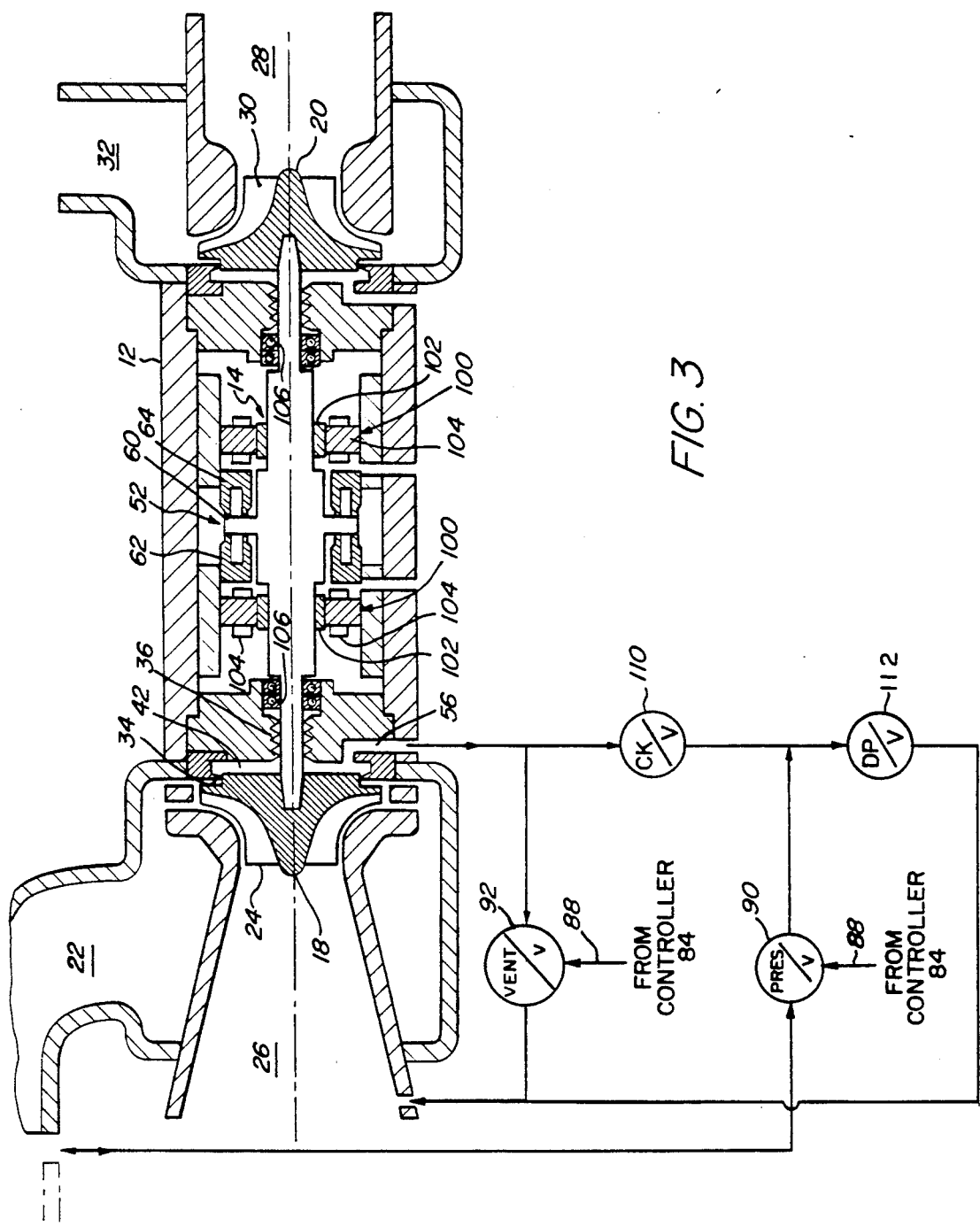
FIG. 3 is a cross-sectional view of a turbo expander/compressor unit including pressurization and vent valves under the control of the controller of FIG. 1 for controlling the fluid pressure behind the expander wheel.

A more complete cross-sectional view of the machine of FIG. 1 is shown in FIG. 3. A pair of active magnetic radial bearings 100 hold the rotor in a centered position with respect to the rotational axis. The radial bearings include ferromagnetic laminations 102 carried by the rotor and electromagnets 104 mounted on the stator. Radial position sensors (not shown) detect deviations of the rotor from its centered position and supply signals to a conventional radial position servo system control circuit (not shown) which directs current to the electromagnets 104 to bring the rotor back to its nominal position. Auxiliary bearings 106 are used to support the rotor while the machine is turned off and in the event of a failure in the magnetic suspension system as discussed previously.

The fluid at the expander inlet 22 (or preferably up stream of an expander block valve) serves as the high pressure source 96. The pressurization valve 90 is connected between the inlet 22 and the fluid passageway 56 in the stator 12 through a check valve 110. The fluid in the expander exhaust 26 serves as the low pressure source 98 with the vent valve 92 connected between the exhaust and the fluid passageway 56 as illustrated.

A differential pressure sensing valve 112 is connected between the check valve 110 and the expander exhaust 26 as shown for limiting the pressure behind the expander wheel to a suitable value, e.g. 100–150 psi, in the event that the pressurization valve 90 fails in an open state.

In operation, with a balanced load on the machine 10, both thrust bearing electromagnets 62 and 64 will be operating at half capacity, e.g., a current of 15 amps to each bearing from the thrust control circuit 68. The setpoint and process control signals are equal and the controller output on lead 88 remains constant, for example 10 ma.

Assume that there is an increase in thrust toward the expander wheel 18. This will cause the current to compressor side electromagnet (64) to increase and the current to expander side electromagnet (62) to decrease. The setpoint signal will fall and the process signal will rise (i.e., pressure behind the expander wheel is too high). The controller 84 will then reduce its output signal to, for example, 9 ma. This will cause the vent valve 92 to partially open, e.g. 37%. The pressure behind the expander wheel will then fall thereby reducing the thrust load until the system is in balance and restoring the magnetic thrust bearing 58 to its full capacity.

An increase in thrust load toward the compressor wheel (representing too low a pressure behind the expander wheel) will result in an output signal from the controller which will open the pressurization valve 90 etc.

Since the system is effective whether or not the shaft is turning it will provide the same balance condition before and during startup. The system will maintain the thrust load supported by the magnetic bearing near zero (or at any preset value as determined by the bias signal source 80). Thus, the maximum available capacity of the magnetic thrust bearing is available at all times.

By way of example, the pressurization and vent valves (90 and 92) may be valve model numbers FSEX-1915 and FSEZ-1705, respectively as distributed by the Fisher Corp. The controller 84 may be a Fisher model no. DPR 900.

There has thus been described a system for controlling the thrust on a fluid handling rotary machine. While the controlled machine is illustrated as a turbo expander unit, it is applicable to other fluid handling rotary machines. It should also be noted that the pressure behind the compressor wheel (in cavity 44) may be controlled in addition to or in lieu of the pressure behind the expander wheel. Various other modifications of the disclosed system will be apparent to those skilled in the art without involving any departure from the spirit and scope of my invention as defined in the appended claims.

What is claimed is:

1. In a system for controlling the thrust on a rotary machine having a stator, a rotor mounted for rotation relative to the stator, generally axially aligned opposed thrust areas for the stator and rotor separated by a fluid receiving space with a fluid passageway communicating with the space; at least one thrust bearing for accepting a generally axial thrust load between the rotor and stator and thrust signal generating means for providing a thrust signal representative of the magnitude and direction of the thrust force on the thrust bearing, the combination which comprises:
   a) first and second sources of fluid under pressure with the first source being at a higher pressure level than the second source;
   b) valve means connected between the fluid passageway and the first and second sources of pressurized fluids; and
   c) control means responsive to the thrust signal for controlling the valve means to selectively conduct fluid from the first and second sources to the fluid receiving space to increase or decrease the pressure in said space to maintain the thrust force load on the thrust bearing at a preset value.

2. The combination of claim 1 wherein said preset value is zero.

3. The combination of claim 2 wherein the valve means comprises first and second valves connected between the fluid receiving space and the first and second sources of pressurized fluid, respectively, each of the first and second valves being arranged to be controlled in a fully closed, fully open and partially open position.

4. The combination of claim 3 wherein the control means is arranged to open one of said first and second valves at a time.

5. The combination of claim 4 wherein the control means is arranged to open or close one of said first and second valves when the value of the thrust signal represents a force on the thrust bearing in one direction and to open or close the other of said valves when the value of the thrust signal represents a force on the thrust bearing in the other direction.

6. In a system for controlling the thrust on a thrust bearing between the rotor and stator of a fluid handling rotary machine having an inlet for receiving fluid at one pressure and an outlet for discharging fluid at another pressure, the rotor and stator having generally axially opposed thrust areas separated by a cavity and bounded at an inner and an outer circumference by radially spaced sealing means, the machine further defining a fluid passageway in communication with the cavity, the combination comprising:
  a) thrust signal generating means for generating a thrust signal which is a measure of the magnitude and direction of the thrust force on the thrust bearing;
  b) first and second sources of fluid under pressure, the first source being at a different pressure level than the second source;
  c) valve means connected between the fluid passageway and the first and second sources of pressurized fluid;
  d) control means responsive to the thrust signal for controlling the valve means to selectively conduct fluid from the first and second sources to the fluid passageway to increase or decrease the fluid pressure in said cavity to minimize variations of the thrust force from a preset value.

7. The combination of claim 6 wherein the valve means comprises first and second valves connected between the fluid passageway and the first and second sources of pressurized fluid, respectively, each of the first and second valves having an open position which may vary between 0% to 100%, and wherein the control means is arranged to open only one of the first and second valves at a time.

8. The combination of claim 7 wherein the first source of pressurized fluid is the fluid at the machine inlet and the second source of pressurized fluid is the fluid at the machine outlet.

9. The combination of claim 8 wherein the preset value is about zero.

10. The combination of claim 9 further including a pressure relief valve connected to the fluid passageway for limiting the maximum pressure within the cavity to a predetermined value.

11. In a system for controlling the thrust on an active magnetic thrust bearing positioned between the rotor and stator of a turbo expander having an inlet for receiving fluid at one pressure and an outlet for discharging fluid at a lower pressure, the rotor and stator having generally axially opposed thrust areas separated by a thrust cavity and bounded at an inner and outer circumference by radially spaced sealing means, the stator defining a fluid passageway in communication with the cavity, the thrust bearing including a thrust disk armature carried by the rotor, a pair of electromagnets mounted on the stator on each side of the thrust disk, and a servo thrust control system for sensing deviations of the rotor from a nominal position and supplying current to the electromagnets to counterbalance the thrust load imparted to the rotor, the difference in current to the electromagnets representing the direction and magnitude of the force on the thrust bearing, the combination comprising:
  a) a vent valve connected between the fluid passageway and the expander outlet;
  b) a pressurization valve connected between the fluid passageway and the expander inlet, each of the vent and pressurization valves having a closed, a fully open and a partially open position;
  c) a controller responsive to the current in the thrust bearing electromagnets for controlling the vent and pressurization valves to selectively conduct fluid from the thrust cavity to the expander outlet or conduct fluid from the expander inlet to the thrust cavity to increase or decrease the fluid pressure in said cavity to minimize variations of the thrust force from a preset valve.

12. The combination of claim 11 wherein the controller is arranged to open only one of the vent and pressurization valves at a time.

13. The combination of claim 12 wherein the preset valve is about zero.

14. The combination of claim 13 further including a pressure relief valve connected between the fluid passageway and the expander outlet for limiting the maximum pressure within the cavity to a predetermined valve.

* * * * *